March 17, 1942.   A. M. HENRY   2,276,694
FASTENER
Filed Dec. 4, 1940
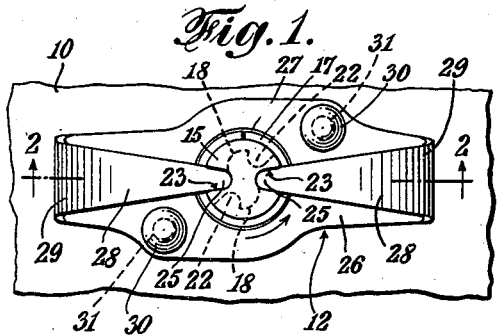
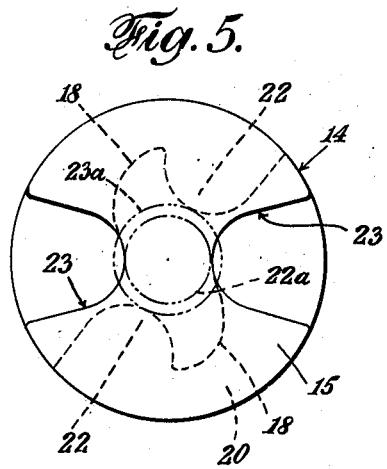
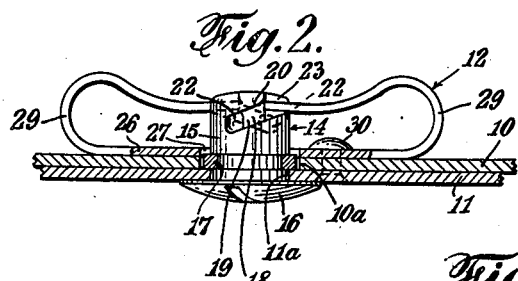
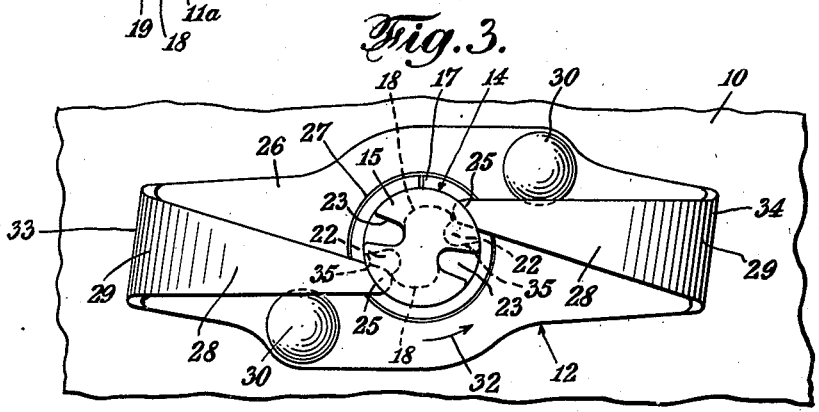
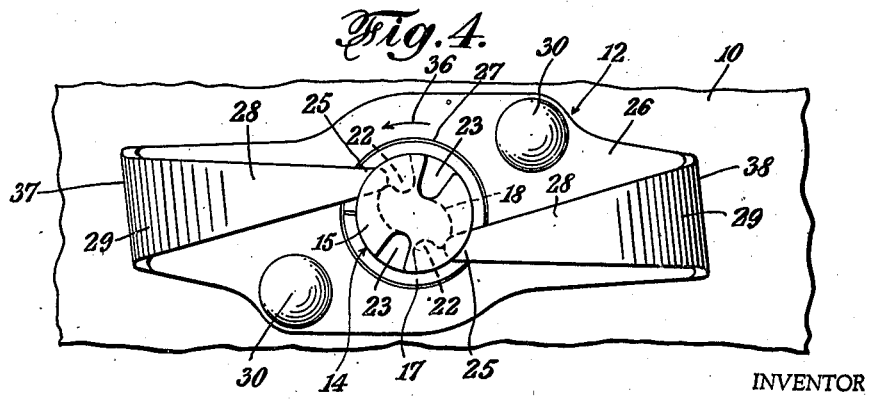
INVENTOR
Augustus M. Henry Patented Mar. 17, 1942

2,276,694

UNITED STATES PATENT OFFICE 2,276,694

FASTENER

Augustus M. Henry, Brooklyn, N. Y.

Application December 4, 1940, Serial No. 368,464

6 Claims. (Cl. 24—221)

This invention relates to fasteners intended for the quick coupling of two parts, after one such part, as a sheet or plate, has been laid over another such part, as another sheet or plate, and for quick uncoupling to allow separation of said parts.

More specifically, the invention relates to that type of fastener which includes a spring means for placement beneath and securement to the underlying plate, a stud having a head and a reduced shank for insertion through matching holes in both plates, and latching means partially carried by the spring means and partially carried by the stud shank; all whereby, to lock the fastener closed and draw the joint tight, it is merely required to insert the stud shank through said holes so as to leave the head of the stud on the outside of the overlying plate, and then and by way of said head fractionally to rotate the stud.

In addition to other fields of usefulness, one very important such field is in airplane manufacture; as in coupling overlapped plate or sheet members, to build up sheathing-sections, at engine cowlings or elsewhere.

The object of the present invention is to provide a novel combination of stud and spring means, for constituting the coactive elements of a fastener having a new and useful mode of operation in securely yet readily detachably coupling two plates. As will be understood, in referring to plates, there is meant a plate and any other type of member, or two members of any kind.

The new fastener is in part characterized by special shapings of the stud. Included in these shapings are ones so formed that in turning the stud in locking direction they act screw-thread fashion, to thrust axially of the stud relative to resiliently movable claws carried by the spring means, and also ones so formed that they act as cam-means, to thrust outwardly radially of the stud relative to said claws; these thrusts operating in timed relation on the claws, the axial thrusts for moving the claws to place the spring means under a tension effective to draw and hold the joint tight, and the radial thrusts for moving the claws for placing the spring means under a different kind of tension and one for positionally and resiliently conditioning them to prepare them for that powerful latch-lock coaction with the stud characteristic of the invention because resulting from the tension last-mentioned. In this last regard, a further feature of the new fastener is the provision of a spring means having elongate portions constituting arms aligned for end-on convergence toward each other in their directions of extensions toward their free ends, said ends carrying the claws in predetermined spacing and so that the free ends of the claws endwisely face each other, and with these arms so carried by the spring means at their claw-remote ends that said arms are resiliently movable in a plane normal to the stud axis, for abnormal separation of the claws, more readily by lateral swing of the claws than by longitudinal shift of said arms toward their claw-remote ends, in response to thrusts from the cam-means.

In combination with these features of stud and spring means, the stud shapings further include claw-receiving pockets so placed that as the stud nears locking position, while being turned in locking direction, the claws pass directly from the cam-means, that is, in effect they drop free of the shoulders partially contributed by the final drops of the cam-means and partially contributed by the adjacent side-wall portions of the pockets, into the pockets. Then both claws snap deep into the pockets by what may be called a side-swipe motion under great and suddenly exerted driving force, to effect that powerful latch-lock coaction with the stud above mentioned.

The invention will be more clearly understood from the following description of the now favored embodiments of the new stud and of the new spring means as shown, in exemplification of the invention, in the accompanying drawing.

In this drawing:

Fig. 1 is a view in top plan, that is, looking down toward the inner face of the inner plate, with the stud inserted through both plates but not yet rotated fractionally to locking position; the stud-shank being shown with its free-end uppermost, which end of the stud will hereinafter be referred to as the top or upper end of the stud.

Fig. 2 is partially a side elevation, and partially a section taken on the line 2—2 of Fig. 1, showing the parts disposed as in Fig. 1.

Fig. 3 is a view similar to Fig. 1, on an enlarged scale, showing the disposition of the parts with the stud turned just far enough toward locking position to release the claws for deep snap into the stud pockets by the side-swipe motion aforesaid.

Fig. 4 is also a view similar to Fig. 1, on the same scale as in Fig. 3, showing the dispositions of the parts with the stud turned just far enough in unlocking direction to have lifted the claws out of the pockets of the stud onto the cam-means of the latter.

Fig. 5 shows the stud-shank as in Fig. 1, but on a sufficiently large scale to bring out clearly the preferred shape of the cam-means, and the relationships between the latter, the pockets beyond the same, and the claw-accommodating recesses or grooves ahead of the cam-means, and also to show clearly another present preference, which is a slightly greater depth for said grooves than for said pockets.

In these views, part of a lapped joint between an inner plate 10 and an outer plate 11 is illustrated; the inner plate for having secured to the inner face thereof the new spring means, marked generally 12. The stud is marked generally 14, and to allow passage of the stud shank through both plates, after they have been overlapped, they have holes punched therethrough as shown to provide properly matching openings in the two plates for insertion of the stud shank 15 through the joint.

It is sometimes desirable to have the stud secured to and for rotation in the plate 11, so that in coupling the joint said shank is inserted merely through an opening in the plate 10. A simple way of thus mounting the stud on the plate 11 would be to provide in the stud shank, as clearly shown in Fig. 2, an annular groove spaced from the head 16 of the stud by about the thickness of the plate 11, and to seat in said groove the inner circumferential portion of a split-ring spring washer 17 so that the outer portion thereof projects to act as a retaining collar. In such case, as shown, the outer plate 11 has its opening 11a of about the diameter of the stud shank while the inner plate 10 has its opening 10a somewhat greater than the outside diameter of the washer 17.

The stud shank 15 is solid instead of tubular, and the special shapings of the stud, consequently, are established, not by slottings through a tubular shank, but by externally depressing or recessing the solid shank. This not only allows the stud to be made at trifling cost, because capable of being made, and as thus made to include such recesses or depressions, but also makes it feasible to incorporate the cam-means aforesaid, these being shown at 18. Each cam-means 18 is formed at the bottom wall of each of a pair of channels 19 so shaped that the upper or downwardly facing side wall 20 of each channel constitutes a downwardly facing ramp spirally extended down along the stud shank alongside a cam-means 18. These ramps 20 thus face the head of the stud, and each of them spirally ascends away from said head, in the direction in which the stud is turned for locking. The rise of a cam-means 18, from its low to its high point, extends in the opposite direction. Beyond each cam-means 18 and adjacent to the lower end of its companion spiral ramp 20 is a pocket 22 inwardly radially recessed into said shank; and ahead of each cam-means and ramp is a straight channel or groove 23 starting at the upper end of the shank and extended down along the same parallel to its axis. As shown, said grooves 23 are spaced 180° around the stud shank, the pockets 22 are similarly spaced, and corresponding parts of the two ramps and of the two cam-means are similarly spaced. The grooves 23 at their lower ends connect with the upper ends of the channels 19 in such manner that the latter are laterally offset continuations of the channels provided by the grooves 23. As shown best in Fig. 5, and as already pointed out, the pockets 22 are preferably of less depth than the grooves 23.

Referring to the spring means 12, the same incorporates two spring structures each for carrying one of the elongate claws aforesaid, said claws marked 25, and is shown as being in the form, for strength, and for ease of securement of said spring structures to the plate 10, of a one-piece spring member of the leaf-spring type. As thus made, the spring means 12 comprises a central elongate flat basal length 26 having a hole 27 through which the stud shank can be passed; terminal lengths or supports flatwisely facing said basal length and constituting transversely resiliently flexible arms 28 having portions at their free ends establishing the claws 25; and intermediate lengths or supports 29 bent upwardly away from the opposite ends of the basal length and joining the latter and said arms. Each of these lengths 29 apparently acts most satisfactorily, in coacting with the arm 28 which it mounts and with the part of the basal length 26 extending from the hole 27 to said length 29, when said part of the basal length is properly secured to the inner plate 10, to provide one of said spring structures for mounting a claw 25 for coaction with the stud shapings according to the invention, if said length 29 is bent along its flat, as shown, to substantially a C-shaped curvature. With these spring structures parts of a one-piece spring member, as shown, merely two rivets 30 need be used for securing the spring means 12 to the inner plate 10; and holes 31 through the spring member for having the shanks of these rivets pass therethrough can be placed, also as shown, at locations such that the rivet heads are not covered by the arms 28. This makes for ease and quickness in securing the spring means to the plate 10.

The arms 28 flatwisely face the basal length 26, as do the claws 25. Said arms longitudinally thereof are substantially aligned with one another and with the lengthwise dimension of said basal length, for end-on approach toward each other generally in a plane substantially parallel to the plane of the basal length, and in their directions of extension toward their free ends carrying the claws 25, with, normally, said claws extending overlappingly of the hole 27 in the basal length while endwisely facing each other in predetermined spacing from each other and from the basal length. As thus normally located, the claws 25 are carried by means, comprising the basal length 26, the upbent lengths or supports 29, and the arms 28, for resiliently floatingly mounting the claws for adapting them for dipping movements toward an underlying part, to wit, the basal length 26, and for adapting them simultaneously for swing in the general direction of extension of said basal length but laterally thereof or for lateral swing in the plane of their own flats, to abnormally space the claws 25; such swings of the claws resulting from the fact that there is greater resistance to abnormal separation of the claws by longitudinal shift of the arms 28 toward the upbent lengths 29 than to such separation by swing of the arms 28 to the positions thereof shown in Figs. 3 and 4.

Referring again to the stud 14, it has already been stated that the pockets 22 are preferably of less depth than the grooves 23. This feature will be present when, as is also preferred, the normal spacing of the claws 25 from each other is less than the diameter of the stud-shank 14 minus the sum of the depths of the pockets 22. In this connection, note the difference in depths of the pockets 22 and the grooves 23 as shown in Fig. 5, such difference measured by the difference between the radii of the two dot-and-dash circles 22a and 23a, these circles concentric with each other and with the axis of the stud.

Operation

Following insertion of the stud shank 15 through the inner plate 10 to dispose the stud 14 as in Figs. 1 and 2, that is, with the claws 25 in the grooves 23, a fractional rotation of the stud, from the exterior of the joint, by way of its head 16, results in, first, transferring the claws from said grooves into the upper ends of the channels 19, next, a movement of the ramps 20 past the tops of the claws and a simultaneous movement of the cam-means 18 past the edges of the claws, next, a freeing of the claws from the high points of said cam-means, and, last, a side-swipe motion of the claws from said points of the cam-means for snap deep into the pockets 22.

Referring to Fig. 3, where the direction of turning of the stud for locking is indicated by the arrow 32, the claws 25 are just about ready to snap from the high points of the cam-means 18 and into the pockets 22; the arms 28 having been laterally swung as already described and as here illustrated. The parts of the spring means comprising and in the vicinity of the upbent lengths 29 thereof are under very high abnormal tension at this instant of release of the claws from the cam-means; which tension has been attempted to be shown, but exaggeratedly, at 33 and 34. Due to this tension, the movement of the claws 25 into the pockets 22 is exceedingly rapid, and at a rate of speed so much faster than the usual speed of turning of the stud by way of its head that apparently the claws strike the outer ends of the side walls 35 an infinitesimal fraction of a second before the claws settle themselves squarely in the pockets 22. At any rate, a loud clicking sound is given, and heard by the mechanic turning the stud, at about the same instant his sense of feel tells him that the fastener ought to be fully locked; this click being a positive signal that the fastener is absolutely in locked condition.

But not only is the fastener then absolutely in locked condition, but the joint between the plates 10 and 11 is drawn very tight, due to the action of the ramps 20 in forcing the claws 25 down to abnormal locations close to the head of the stud, in which locations they are held while seated in the pockets 22.

With these pockets of less depth than the grooves 23, as aforesaid, the ends of the claws contact the bottoms of the pockets, or even thrust against such bottoms, as is still more desirable, and as it is possible to arrange for, despite the fact that the claws, in being brought down along the stud to the pockets by the ramps 20, are, incidental to the dipping movements thereby given them, moved to a somewhat greater degree of separation than between them when they are in the grooves 23.

Referring finally to Fig. 4, the stud 14 is shown as having been turned in the direction of the arrow 36 in unlocking direction, just far enough to lift the claws 25 out of the pockets 22 and onto the cam-means 18. This freeing of the claws from the pockets, also, is by forcing the arms 28 to lateral swings to put them under a high abnormal tension; which tension has been attempted to be shown, again exaggeratedly, at 37 and 38. The opposition to unlocking is greater than to locking. In locking, the arms 28 are tensioned as in Fig. 3 by gradual action of the cam-means 18; whereas, in unlocking, the arms 28 must be tensioned as in Fig. 4 by a very small initial angular movement of the stud.

What is claimed as new is:

1. In a fastener for detachably coupling an outside part to an inside part by fractional rotation of a headed stud the shank of which is extended through matching openings in said parts, the combination of such a stud, the shank of which is externally recessed to provide inwardly directed pockets and channels each starting at the upper end of the shank and thence running girthwisely and lengthwisely thereof, each of said channels including a downwardly facing ramp and alongside the latter a spirally descending cam rising to its high point adjacent to one of said pockets; and a spring-means which is a one-piece leaf-spring member carrying terminal claws for coaction with said channels and pockets, said spring member including a central elongate substantially flat basal length for placement against the inner side of said inside part and having a hole through which said shank can be passed and means whereby said basal length in the vicinity of said hole can be immovably secured to said inner part, said claws being the free-end portions of terminal lengths of said spring member flatwisely facing said basal length and substantially aligned with one another to endwisely approach each other from points adjacent to the opposite ends of said basal length along general lines of extension substantially parallel to the direction of extension of the latter to constitute spring arms flexible toward said basal length, and means, comprising lengths of said spring member bent away from the opposite ends of said basal length and joining the latter and said arms, for supporting said arms and resiliently biassing them to position said claws overlappingly of said hole and in predetermined spacing from each other and from said basal length.

2. A fastener as in claim 1, in which the said bent lengths of the spring member are bent along their flats to substantially a C-shaped curvature, such bends to resiliently floatingly support said arms and claws for less resistance to swing laterally of said basal length than to shift of said claws separatingly by movement of said arms longitudinally thereof.

3. In a fastener, the combination of a resilient means for securement to a part having an opening therethrough and to be coupled by the fastener to another part, said resilient means including a pair of resilient structures each incorporating a resiliently transversely flexible arm having a free end for acting as a claw; positioning means for said resilient structures and including portions thereof whereby they are securable to said first-named part in placements thereon such that said claws edgewisely face each other in spaced relation adjacent to said opening; and a headed stud having a shank insertable through said opening, said shank having external recesses in the form of channels, two of which channels, spaced around the shank substantially 180° apart, start from the free end of said shank and extend down along the same in substantial parallelism with the stud axis to act as interceptors for the claws on inserting the shank through said opening, and two others of which channels, each laterally offset from a different one of the first-named channels, are so shaped that following interception of the claws by the first-named channels, fractional rotation of the stud forces the claws down along said shank abnormally close to the head of the stud, said recesses also including two pockets spaced around the shank substantially 180° apart and having their directions of depth substantially radial to the stud axis, one of said pockets at each of said locations, each of said laterally offset channels leading to one of said pockets and over a portion of its length adjacent to its pocket decreasing more and more in depth as said portion approaches closer and closer to said pocket, whereby during rotation of the stud the claws are first forced to abnormal separation and then released to snap into said pockets to interlock therewith to prevent accidental retrograde turning of the stud, said resilient structures being so shaped and normally tensioned that when secure to said first-named part as aforesaid said claws are normally resiliently urged to a lesser degree of separation than the diameter of said shank less the sum of the depths of said laterally offset channels at their points of minimum depth.

4. In a fastener of the kind described, the combination of a spring means carrying a pair of endwisely facing spaced claws; means for attaching said spring means to an underlying part to be joined by the fastener to an overlying part; means included in said spring means for then resiliently floatingly mounting said claws for dipping movement toward said underlying part and for simultaneous lateral swing to displace them from their said endwisely facing relation to abnormally space said claws; and a headed stud the shank of which is externally recessed to provide at the free end of said shank entrance grooves for intercepting said claws, downwardly facing spirally extending ramps in continuation of said grooves for forcing the claws to said dipping movements to draw the joint tight during turning movement of the stud in locking direction, cam-means alongside said ramps for forcing the claws to said swinging movements during said turning of the stud, and pockets beyond said cam-means positioned to allow side-swipe snap of the claws thereinto as the stud is turned sufficiently far in locking direction to release the claws from the cam-means.

5. In a quick detachable fastener for securing together two members with a portion of one of said members overlapping a portion of the other, said fastener being of the type including a resilient means carried by one of said members adjacent to a hole therethrough substantially matching a hole through the other of said members, the combination of such a resilient means, the same including a spring element and an elongate claw element carried thereby and having an end for locking coaction with a cooperant fastener element of the fractionally rotatable type, said resilient means also including a support for said claw-element and means for coacting with said support to secure said resilient means to said member first-named thereby to mount said claw-element on said member with said locking end of said claw-element normally positioned overlappingly of said first-named hole; and a cooperant fractionally rotatable stud including a shank having external shapings therealong, said shapings including a channel starting at the upper end of the shank and thence running girthwisely and lengthwisely thereof, said shapings further including a pocket adjacent to the lower end of said channel for acting as an impositive detent-element for said claw-element, said channel having a bottom wall which recedes from the stud axis as said wall extends toward the lower end of said channel, said wall reaching its maximum said recession at a point nearer to said detent-element than to the upper end of said channel and so providing a cam-means for acting solely during rotation of the stud in fastening direction to place said resilient means under abnormal tension by thrust of said wall against said claw-element laterally thereof, to cause snap-latching of said claw-element into said detent-element substantially simultaneously with the conclusion of the last-performed portion of said stud rotation.

6. In a quick detachable fastener for securing together two members having holes to be matched when a portion of one of said members is arranged overlappingly of a portion of the other, the combination of a resilient means to be carried by the underlying one of said members adjacent to its said hole, said means including a plurality of spring elements and a plurality of elongate claw-elements and also including supports for said claw-elements, said resilient means further including means for coacting with said supports to secure said resilient means to said underlying member thereby to position said claw-elements with their free ends overlapping said last-named hole; and a rotatable stud including a shank having external shapings therealong, said shapings including a pair of channels each starting at the upper end of the shank at spaced points therearound and thence running girthwisely and lengthwisely thereof, said shapings further including pockets adjacent to the lower ends of said channels for acting as impositive detent-elements for said claw-elements, at least one of said channels having a bottom wall which recedes from the stud axis as said wall extends down along the shank toward the lower end of said channel, said wall reaching its maximum said recession at a point nearer to the detent-element toward which said channel extends than to the upper end of said channel and so providing a cam-means for acting only during rotation of the stud in fastening direction to place said resilient means under abnormal tension by thrust of said wall against the adjacent claw-element in a direction at an angle to the direction of elongation of said claw-element, to cause snap-latching of said claw-element into the last-named detent-element substantially simultaneously with the conclusion of the last-performed portion of said stud rotation.

AUGUSTUS M. HENRY.